W. Somerville,
Horse Boots,
No. 28,017. Patented Apr. 24, 1860.

Witnesses;
Thos. P. How
John Cunnly

Inventor;
Wm Somerville

UNITED STATES PATENT OFFICE.

WILLIAM SOMERVILLE, OF NEW YORK, N. Y.

DEVICE TO PREVENT HORSES FROM INTERFERING.

Specification of Letters Patent No. 28,017, dated April 24, 1860.

*To all whom it may concern:*

Be it known that I, WILLIAM SOMERVILLE, of New York, in the county of New York and State of New York, have invented a Device for Preventing Horses from Interfering, the construction and operation of which I have described in the following specification and illustrated in its accompanying drawings with sufficient clearness to enable competent and skilful workmen in the arts to which it pertains or is most nearly allied to make and use my invention.

It is well known that many horses injure themselves by hitting their feet against their legs in traveling, thereby seriously injuring the animal, and materially reducing his value in the market. Pads have sometimes been placed upon the knee of the horse to reduce the difficulty, but these are unsightly, inconvenient, and do not sufficiently answer the purpose intended.

My said invention consists in cementing a pad of india-rubber, or other similar substance into a recess made for the purpose in the hoof of the horse, and in a proper position to prevent the contussions complained of.

Figure 1:
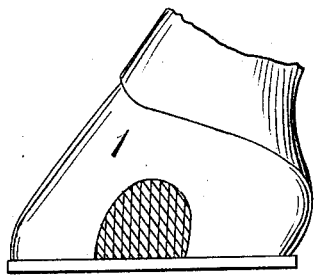
Figure 2:
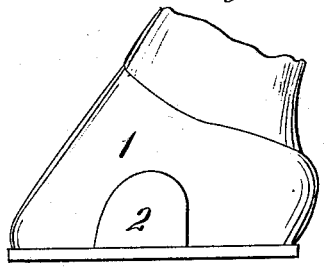
Figure 3:
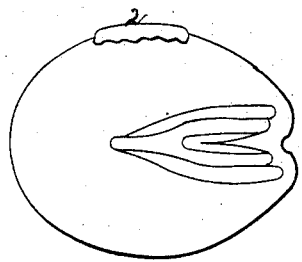
Figure 4:

The accompanying drawings illustrate my invention as follows:

Figure 1 is a side elevation of the foot prepared to receive the pad. Fig. 2 is a like elevation with the pad attached. Fig. 3 is an underside view of the hoof with the pad attached, the shoe being removed to give a better representation. Fig. 4 is a transverse vertical section of a part of the hoof with the pad attached. It is taken through the pad as well as a part of the hoof.

1 is the hoof of the horse. To find the proper place to attach the pad, I first smear the inner side of the hoof with soap or some other substance which will answer the same purpose, and then start the animal off at a gait at which he will hit his feet against his legs. In doing this, the horse will brush off the soap from that part of the foot which strikes against the leg, and thus indicate the exact spot at which the pad should be applied. I then make a recess in the hoof about one-eighth of an inch in depth at the spot thus indicated as shown in Fig. 1 in which the form of the recess and its proportionate size are represented, and having scarified the bottom of the recess as there shown I attach a pad 2 of india-rubber as shown in Figs. 2, 3, and 4, uniting the rubber to the hoof by means of the common and well known india-rubber cement. I allow the pad to project from one-eighth to one fourth of an inch outside of the natural hoof as it would appear before the outside had been removed for the insertion of the pad. I prefer vulcanized india-rubber for the purpose. This pad may extend down flush with the bottom of the shoe if desired, the shoe being recessed away to allow the rubber to fit into it, and in any case whether the rubber extends down by the shoe or not, the shoe should retire a little under the pad. The pad when properly made and attached prevents the hard hoof and the shoe from striking the leg, and furnishes a soft flexible substance which strikes instead, but which from its soft and yielding nature does not injure the leg. This device is simple, cheap, not unsightly, and by experiment is found to answer the purpose.

Having thus fully described my said invention, I claim—

Providing the foot of a horse with a pad inserted and attached substantially as described for the purpose set forth.

WM. SOMERVILLE.

Witnesses:
 THOS. P. HOW,
 JOHN CRUMLY.